US011269595B2

(12) United States Patent
Ramzan et al.

(10) Patent No.: US 11,269,595 B2
(45) Date of Patent: Mar. 8, 2022

(54) ENCODING AND EVALUATING MULTISETS USING PRIME NUMBERS

(71) Applicant: EMC IP Holding Company LLC, Hopkinton, MA (US)

(72) Inventors: Zulfikar A. Ramzan, Saratoga, CA (US); Sashka T. Davis, Vienna, VA (US); Nicholas H. Hoang, Chantilly, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 286 days.

(21) Appl. No.: 16/671,292

(22) Filed: Nov. 1, 2019

(65) Prior Publication Data

US 2021/0132907 A1    May 6, 2021

(51) Int. Cl.
*G06F 16/00*     (2019.01)
*G06F 7/52*      (2006.01)
*G06F 16/22*     (2019.01)

(52) U.S. Cl.
CPC .......... *G06F 7/52* (2013.01); *G06F 16/2228* (2019.01); *G06F 16/2291* (2019.01)

(58) Field of Classification Search
CPC .... G06F 7/52; G06F 16/2291; G06F 16/2228; G06F 7/523; G06F 16/134; G06F 16/22; G06F 16/31; G06F 16/41; G06F 16/61; G06F 16/71; G06F 16/81; G06F 16/901
See application file for complete search history.

(56) References Cited

U.S. PATENT DOCUMENTS

| | | | | |
|---|---|---|---|---|
| 5,812,072 A * | 9/1998 | Masters | ............... | H03M 13/00 341/55 |
| 7,058,965 B1 * | 6/2006 | Gordon | ............. | H04N 21/2362 370/537 |
| 7,631,296 B2 * | 12/2009 | Seshadri | ............... | G06N 5/046 717/117 |
| 7,698,325 B1 * | 4/2010 | Ozekinci | ............ | G06F 16/2228 707/698 |

(Continued)

OTHER PUBLICATIONS

Christian Steinruecken et al. Compressing Sets and Multisets of Sequences, arXiv:1401.6410v1 [cs.IT] Jan. 24, 2014.

(Continued)

*Primary Examiner* — Noosha Arjomandi
(74) *Attorney, Agent, or Firm* — Ryan, Mason & Lewis, LLP (57) ABSTRACT

Techniques are provided for multiset encoding and evaluation. One method comprises encoding a multi set comprised of entities as a product of a prime number assigned to each entity in the multiset to obtain an integer representation of the multiset; adding a first entity to the multiset by multiplying the integer representation of the multiset by the prime number assigned to the first entity; removing a second entity from the multiset by dividing the integer representation of the multiset by the prime number assigned to the second entity; and identifying the entities in the multi set by decomposing the integer representation into a product of the prime numbers assigned to each of the entities in the multiset. The entities in the multiset can be, for example, devices that a given user was connected to at the given time; and/or the users connected to a given device at the given time.

20 Claims, 8 Drawing Sheets

(56) References Cited

U.S. PATENT DOCUMENTS

| | | | |
|---|---|---|---|
| 7,813,822 B1* | 10/2010 | Hoffberg | H04N 21/44222 |
| | | | 700/94 |
| 10,684,738 B1* | 6/2020 | Sicora | G06F 16/435 |
| 2003/0023753 A1* | 1/2003 | Rychlicki | H04L 29/12207 |
| | | | 709/245 |
| 2009/0022319 A1* | 1/2009 | Shahaf | H04L 9/0656 |
| | | | 380/278 |
| 2009/0193224 A1* | 7/2009 | Vishnu | H04L 9/3226 |
| | | | 711/216 |
| 2009/0271421 A1* | 10/2009 | Gemulla | G06F 16/2453 |
| 2011/0270902 A1* | 11/2011 | Dimitrov | G06F 7/483 |
| | | | 708/204 |
| 2013/0198854 A1* | 8/2013 | Erway | G06F 21/60 |
| | | | 726/27 |
| 2016/0295633 A1* | 10/2016 | Baligh | H04W 76/25 |
| 2017/0161519 A1* | 6/2017 | Takahashi | G16Z 99/00 |
| 2017/0213047 A1* | 7/2017 | Huang | G06F 3/0623 |
| 2017/0300489 A1* | 10/2017 | Qin | G06F 16/2255 |
| 2017/0300528 A1* | 10/2017 | Qin | G06F 16/2255 |
| 2019/0266235 A1* | 8/2019 | Northrup | G06F 40/289 |
| 2019/0341930 A1* | 11/2019 | Pavlovic | G06T 9/001 |
| 2020/0005032 A1* | 1/2020 | Freed | G06K 9/00469 |
| 2020/0125827 A1* | 4/2020 | Freed | G06K 9/2063 |
| 2020/0242268 A1* | 7/2020 | Epasto | G06F 16/212 |
| 2020/0344084 A1* | 10/2020 | Shribman | H04L 69/16 |
| 2020/0374101 A1* | 11/2020 | Hoshizuki | H04L 9/0618 |
| 2021/0126926 A1* | 4/2021 | Kaidi | H04L 63/1416 |

OTHER PUBLICATIONS

Gordon Chalmers, Data Compression with Prime Numbers, arXiv:physics/0511145v1 [physics.gen-ph] Nov. 16, 2005.

* cited by examiner

FIG. 1

| Time Period | User | Action | Multi-sets |
|---|---|---|---|
| 1 | Alice | Alice connects to machine $M_1$ | Alice: $\{M_1\}$ |
| 1 | Bob | Bob connects to machine $M_2$ | Alice: $\{M_1\}$, Bob: $\{M_2\}$ |
| 2 | Alice | Alice connects to machine $M_3$ | Alice: $\{M_1, M_3\}$, Bob: $\{M_2\}$ |
| 4 | Bob | Bob connects to machine $M_3$ | Alice: $\{M_1, M_3\}$, Bob: $\{M_2, M_3\}$ |
| 6 | Alice | Alice establishes a 2nd connection to $M_1$ | Alice: $\{M_1, M_1, M_3\}$, Bob: $\{M_2, M_3\}$ |
| 7 | Bob | Bob disconnects from $M_2$ | Alice: $\{M_1, M_1, M_3\}$, Bob: $\{M_3\}$ |
| 9 | Alice | Alice connects to machine $M_4$ | Alice: $\{M_1, M_1, M_3, M_4\}$, Bob: $\{M_3\}$ |
| 11 | Bob | Bob makes a 2nd connection to $M_3$ | Alice: $\{M_1, M_1, M_3, M_4\}$, Bob: $\{M_3, M_3\}$ |
| 12 | Bob | Bob makes a 3rd connection to $M_3$ | Alice: $\{M_1, M_1, M_3, M_4\}$, Bob: $\{M_3, M_3, M_3\}$ |
| 12 | Alice | Alice connects to $M_5$ | Alice: $\{M_1, M_1, M_3, M_4, M_5\}$, Bob: $\{M_3, M_3, M_3\}$ |
| 14 | Alice | Alice disconnection from $M_5$ | Alice: $\{M_1, M_1, M_3, M_4\}$, Bob: $\{M_3, M_3, M_3\}$ |
| 14 | Bob | Bob disconnects one of his connection to $M_3$ | Alice: $\{M_1, M_1, M_3, M_4, M_5\}$, Bob: $\{M_3, M_3\}$ |
| 15 | Bob | Bob connects to $M_6$ | Alice: $\{M_1, M_1, M_3, M_4, M_5\}$, Bob: $\{M_3, M_3, M_6\}$ |
| 16 | Bob | Bob connects to $M_7$ | Alice: $\{M_1, M_1, M_3, M_4, M_5\}$, Bob: $\{M_3, M_3, M_6, M_7\}$ |
| 16 | Alice | Alice disconnects one of her connections from $M_1$ | Alice: $\{M_1, M_3, M_4, M_5\}$, Bob: $\{M_3, M_3, M_6, M_7\}$ |

FIG. 2

Extract Values $(u, \mu, \alpha, \tau)$ Representing User, Device, Action, and Timestamp, Respectively, from Log Entry;

If Per User Data Structure for User $u$ is Being Used for First Time, Insert Node Associated With Timestamp $\tau$ into Per User Data Structure for User $u$. Set Integer Value Associated With That Node to $\Pi(\mu)$;

If Tree has Already Been Initialized, Retrieve Integer Value $n$ Associated With Largest Time Stamp $\tau'$ That Does Not Exceed $\tau$. A Value $n'$ is Computed, as follows:

If $\alpha$ Represents Action of Connecting to $\mu$, Then $n' \leftarrow n^*\Pi(\mu)$.
 If $\alpha$ Represents Action of Disconnecting from $\mu$, Then $n' \leftarrow n/\Pi(\mu)$; and Insert Node for Timestamp $\tau$ Into Per User Data Structure, and This Node is Associated With Integer $n'$.

Identify Per User Data Structure by Retrieving Value Associated With Key $u$;

From Per User Data Structure, Obtain Integer Value $n$ Associated With Largest Timestamp $t'$ Less Than or Equal To $t$;

Decompose Integer Value $n$ Into Prime Powers (e.g., $n = p_1{}^{\wedge}e_1 * p_2{}^{\wedge}e_2 * \ldots * p_s{}^{\wedge}e_s$);

Compute Device Identifiers Associated With Prime Numbers ($\mu_1 = M(p_1)$, $\mu_2 = M(p_2), \ldots, \mu_s = M(p_s)$); and Output $(\mu_1, e_1), (\mu_2, e_2), \ldots, (\mu_s, e_s)$, Where $\mu_k, e_k$ Denotes That Device $\mu_k$ Appears in Multiset $e_k$ Times.

ENCODING AND EVALUATING MULTISETS USING PRIME NUMBERS

FIELD

The field relates generally to information processing techniques, and more particularly, to the processing of multisets of data.

BACKGROUND

One common search query in a security analytics scenario involves identifying the users that were connected to particular devices at a given point in time (e.g., which systems a given user was connected to at a given time; where the information is often derived from log data that includes connectivity information). This particular problem comes up, for example, in the context of user and entity behavioral analytics. To be able to answer this query efficiently, and in near-real-time, appropriate data structures and algorithms are needed. In particular, it is often important to store for each user and time value, a multiset representing, for example, which devices a given user was logged into at a given time.

Tracking this type of multiset, however, can become expensive from a storage perspective. In addition, being able to maintain multisets efficiently is desirable (e.g., permitting efficient insertion of entities into multisets and removal of entities from multisets). A need therefore exists for techniques for encoding and evaluating multiset data. A further need exists for techniques for efficient storage and maintenance of multiset data.

SUMMARY

In one embodiment, a method comprises encoding a multiset comprised of entities, over time, as a product of a prime number assigned to each of the entities in the multiset to obtain an integer representation of the multiset; adding a first entity to the multiset at a first time by multiplying the integer representation of the multiset at the first time by the prime number assigned to the first entity, wherein the first entity is permitted to appear multiple times in the multiset; removing a second entity from the multiset at a second time by dividing the integer representation of the multiset at the second time by the prime number assigned to the second entity; and identifying the entities in the multiset at a given time by decomposing the integer representation of the multiset at the given time into a product of the prime numbers assigned to each of the entities in the multiset at the given time.

In some embodiments, the repeated appearance of the first entity in the multiset is represented using the prime number assigned to the first entity with an indication of the number of times that the first entity appears in the multiset.

In one or more embodiments, the obtaining the multiset comprises ingesting network connectivity log data, and wherein identifying the entities in the multiset at the given time comprises one or more of: (i) identifying devices that a given user was connected to at the given time; and (ii) identifying a plurality of users connected to a given device at the given time. A mapping can be maintained between: (i) an identifier of each of the entities and the corresponding prime number; and/or (ii) each prime number and an identifier of the corresponding entity.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for multiset encoding and evaluation.

One or more embodiments of the disclosure provide improved techniques for encoding and evaluating multiset data, and for efficient storage and maintenance of multiset data. Generally, in mathematics, a set is a collection of distinct objects (e.g., no object is repeated). A multiset allows for multiple instances for each element of the multiset. The positive integer number of instances for a given element is often called the multiplicity of this given element in the multiset.

In some embodiments, a multiset compression algorithm is provided that associates entity (e.g., device) identifiers with prime numbers and encodes a multiset with the product of these prime numbers. In this manner, a multiset can be compactly represented as a single (typically large) integer value. The approach works, at least in part, because of the well-known unique factorization theorem (e.g., every positive integer can be uniquely decomposed into a product of prime powers). Although factoring algorithms have undesirable computational complexity, one or more aspects of the disclosure recognize that these concerns only arise in worst-case scenarios for large numbers and are not an inhibiting factor in many scenarios, such as those scenarios explored in the present disclosure. Moreover, the disclosed prime number approach facilitates efficient multiset insertion and deletion. Further, the disclosed techniques for efficient multiset storage and maintenance can be shown to provide mathematically compact lossless compression of multiset data.

In network analytics and/or in security analytics, one task ingests network log data and, for a specified user and time, produces a list of systems or devices to which the specified user was connected at the specified time. In this list, a given device may be listed multiple times if a user has multiple connections to this given device at a given time. As used herein, the problem of identifying the devices on which a given user was logged into at a given time is referred to as the UMT resolution problem (User-Machine-Time resolution, also referred to as User-Device-Time resolution). This UMT resolution problem comes up, for example, in the context of user and entity behavioral analytics.

Figure 1:
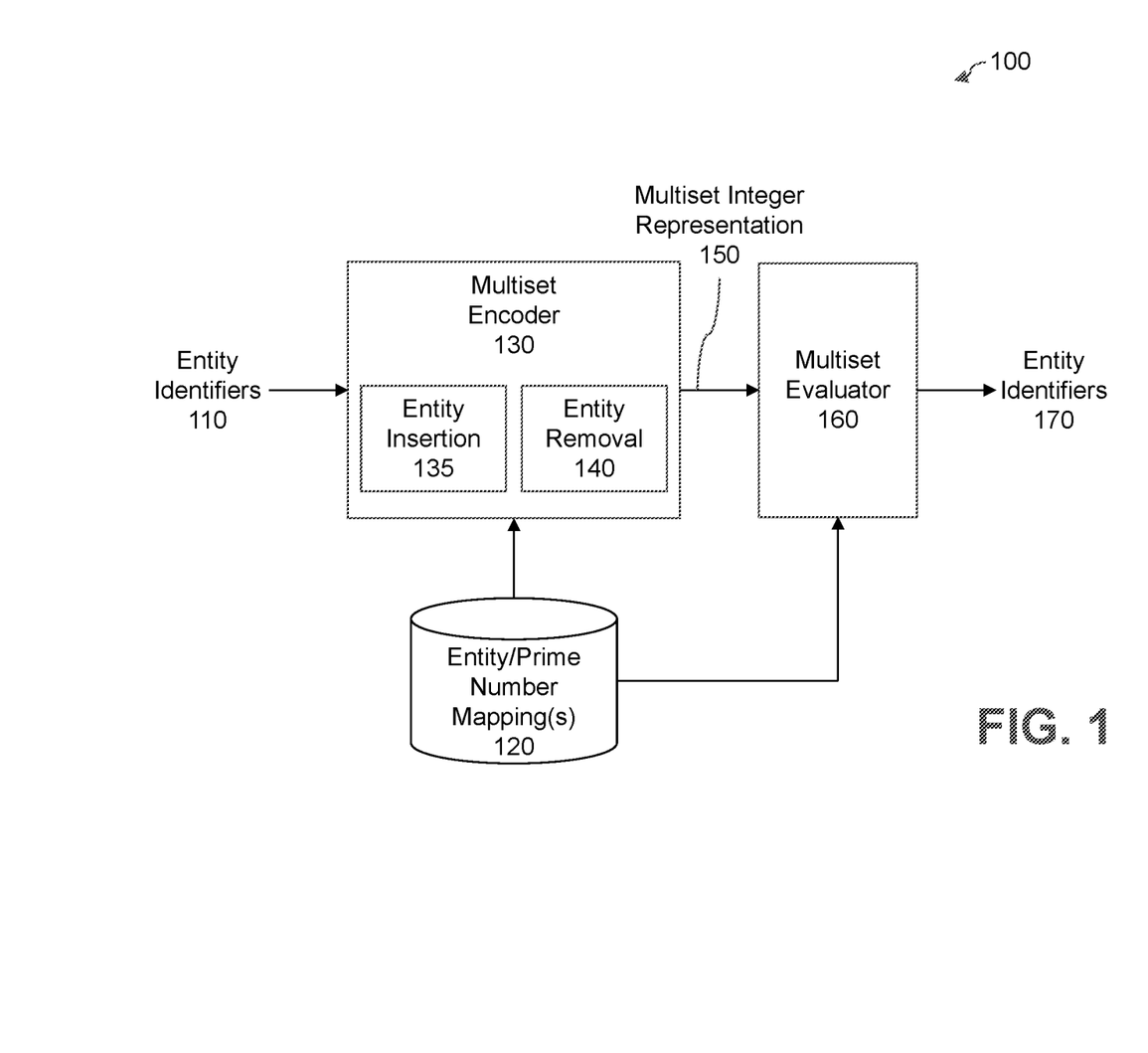
FIG. 1 illustrates an exemplary multiset encoding and evaluation system, according to one embodiment of the disclosure.

FIG. 1 illustrates an exemplary multiset encoding and evaluation system 100, according to one embodiment of the disclosure. As shown in FIG. 1, the exemplary multiset encoding and evaluation system 100 comprises a multiset encoder 130 and a multiset evaluator 160. Multiple entity identifiers 110 are applied to the multiset encoder 130 over time, typically with an indication of whether the corresponding entity is entering or leaving the multiset (e.g., whether a given user device is connecting to, or disconnecting from, a particular device). In one exemplary implementation, the entity identifiers 110 may be obtained from logs that include connectivity (e.g., users connecting to, and dis connecting from, various devices).

Generally, the exemplary multiset encoder 130 encodes a multiset comprised of entities, over time, as a product of a prime number assigned to each of the entities in the multiset to obtain an integer representation 150 of the multiset, as discussed further below. In some embodiments, the prime number assigned to each of the entities in the multiset is stored in a database 120 that maintains an entity-to-prime number mapping (and/or a prime number-to-entity mapping).

As shown in FIG. 1, the exemplary multiset encoder 130 comprises an entity insertion module 135 and an entity removal module 140 that process corresponding actions of an entity entering or leaving the multiset, respectively. Generally, the exemplary entity insertion module 135 adds an entity to the multiset at a given time by multiplying the integer representation of the multiset at the given time by the prime number assigned to the added entity, as discussed further below. Likewise, the entity removal module 140 removes an entity from the multiset at a given time by dividing the integer representation of the multiset at the given time by the prime number assigned to the removed entity, as discussed further below.

In one or more embodiments, the exemplary multiset evaluator 160 generates entity identifiers 170 that identify the entities in the multiset at a given time by decomposing the integer representation of the multiset at the given time into a product of prime powers. These prime powers can then be mapped to the corresponding entities in the multiset using, for example, the prime number-to-entity mapping in the database 120.

Figure 2:
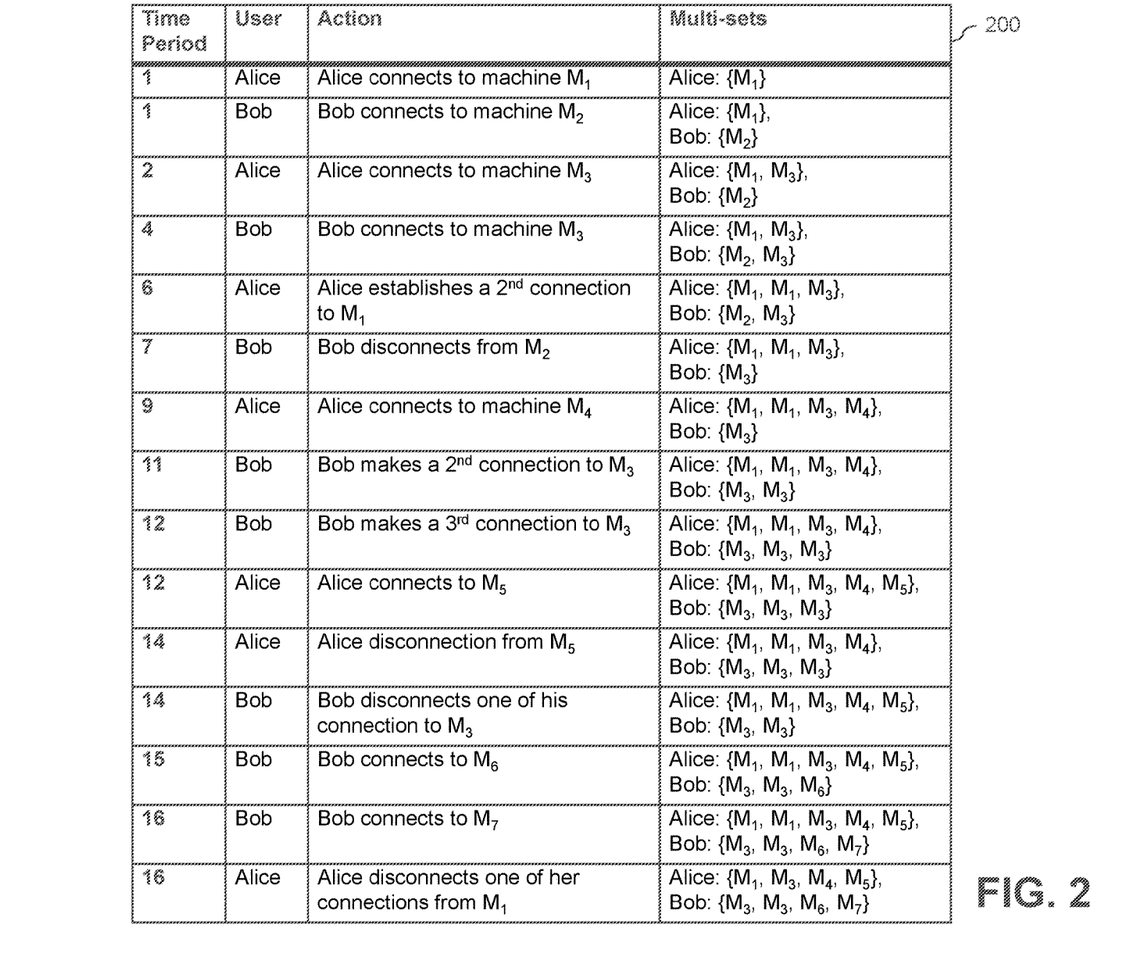
FIG. 2 is a sample table representing the connection actions of two exemplary users, according to one or more embodiments.

FIG. 2 is a sample table 200 representing the actions of two exemplary users, Alice and Bob, as they log into, and out of, various devices, according to one or more embodiments. In the example of FIG. 2, for each relevant time period, an action is performed by the two exemplary users, Alice and Bob. Consider what happens at each time epoch. At time epoch 1, Alice connects to device $M_1$. The set of devices into which Alice is connected at time epoch 1 is $\{M_1\}$. During this same time epoch, Bob connects to device $M_2$; therefore, the set associated with Bob for time epoch 1 is $\{M_2\}$. During the second time epoch, Alice connects to a second device and Bob does not take any actions with respect to connections. Therefore, the set of devices associated with Alice and Bob at this epoch are, respectively, $\{M_1, M_3\}$ and $\{M_2\}$. At time epoch 3, no actions with respect to connections are taken by either Alice or Bob. Therefore, their corresponding multisets remain $\{M_1, M_3\}$ and $\{M_2\}$ respectively. At time epoch 4, Bob connects to $M_3$ and his multiset is $\{M_2, M_3\}$, while Alice remains at $\{M_1, M_3\}$. Their sets remain the same in time epoch 5 as neither of them engages in any actions with respect to connections. In time epoch 6, Alice establishes a second connection to $M_1$. Alice's multiset is now $\{M_1, M_1, M_3\}$—in this case, there is now a true multiset since the element $M_1$ is included twice to reflect the two distinct connections that Alice has with device $M_1$. In time epoch 7, Bob disconnects from $M_2$ and his multiset becomes $\{M_3\}$. This process continues through subsequent time epochs.

To solve the UMT resolution problem efficiently, it is important to store for every user u and time value τ, the multiset of devices that user u was logged into at time τ. Note that multisets do not need to be stored for every possible time value; rather, multiset data only needs to be stored in some embodiments for time values corresponding to those times that are included in a log source (since there are no changes in between). Note also that the representation is a multiset since a given user might have multiple connections to a given system at a given time. However, if done naively, the storage costs for maintaining multisets can be expensive. More so, it is also important to offer mechanisms for maintaining multisets, which includes efficient set insertion and deletion.

In one or more embodiments, the present disclosure provides techniques for solving the multiset storage and maintenance problem. In some embodiments, as noted above, a unique prime number is associated with each device identifier. One or more aspects of the disclosure recognize that multisets can be represented by the product of these prime numbers. In this manner, each multiset can be represented by a positive integer value. Set insertion and deletion can be accomplished through integer multiplication and division. As noted above, the unique factorization theorem states that every positive integer has a unique decomposition into a product of its prime powers. One or more aspects of the disclosure recognize that for the parameter sizes encountered in practice, and the types of prime numbers chosen, integer factorization to extract the multiset from its encoding will not be prohibitively expensive.

As noted above, the UMT resolution problem involves the exemplary multiset evaluator 160 of FIG. 1 efficiently identifying (for a given user and time value) the devices to which a user was connected at a given point in time. The source data comprises logs that include connectivity (though the disclosure extends to other data sources, such as network logs and packets, netflow data, or even endpoint data, as would be apparent to a person of ordinary skill in the art). This problem can be expressed more formally by considering four elements (logs, log ingestion, log update, and UMT response). Each element will be considered in turn.

Logs

In some embodiments, a log entry can be described as a four tuple: (u, μ, α, τ) where u represents a user identifier; μ represents a device identifier; α represents an action taken by the user u on the device μ (e.g., the user u connected to or disconnected from the device μ); and τ represents a timestamp specifying the time at which the user u took the action α on device μ. While one or more embodiments employ the term "log," it is to be understood that the present disclosure is not restricted to traditional network logs, as would be apparent to a person of ordinary skill in the art. Any data source about network activity that includes information indicating which users connected to, or disconnected from, particular machines at particular points in time is sufficient, as would be apparent to a person of ordinary skill in the art. In addition, in further variations for other suitable implementations any data source indicating users entering or leaving a multiset at particular points in time can be processed, as would be apparent to a person of ordinary skill in the art.

It is noted that such connectivity logs and similar data sources can contain additional and/or alternative information. However, for at least some embodiments of the present disclosure, the four above-mentioned log entry items (u, μ, α, τ) are salient.

Log Ingestion

As part of the UMT resolution problem, a set of logs L are analyzed and the results are stored in a data structure D. The present disclosure does not place restrictions on where this data is stored. For example, the data structure D can be stored in cache, in random access memory or on disk, among other locations. The results can also be stored locally or in a different location (e.g., a cloud server accessible over the Internet). The data structure D is used to identify which devices a given user was logged into at a given point in time.

Log Update

After the initial log ingestion period, it should be feasible in one or more embodiments to (efficiently) update the underlying data structure when new log data presents itself. In particular, suppose a data structure D was derived from ingestion of an initial set of logs L. Suppose further that a new set of logs L' arrives. It should be feasible in some embodiments to efficiently transform D into an amended data structure D' which is a function of L' and D (D'←D, L'). Note that this process should be feasible without having to go back and reprocess the initial set of logs L.

UMT Response

In one or more embodiments, for a given user u and time value τ, the UMT response algorithm should efficiently use the (updated) data structure D to produce a multiset of device identifiers $\{\mu_1, \mu_2, \ldots, \mu_n\}$ identifying the devices that the given user u was connected to at time τ. The result can be a multiset, since a given user might have multiple active connections to a given device. In other words, unlike a traditional mathematical set, a multiset would permit the possibility that $\mu_i = \mu_j$ for some i≠j).

Multisets are described in one or more embodiments by specifying each device identifier together with its multiplicity (e.g., the number of times that device identifier appears in the set). For example, $\{\mu_1, \mu_2, \mu_3, \mu_4, \mu_5\}$ will be described as $(\mu_1, 3), (\mu_3, 2), (\mu_5, 1)$ to denote that $\mu_1$ appears three times, $\mu_3$ appears twice, and $\mu_5$ appears only once in the multiset (alternatively, $\mu_3, \mu_5$ have multiplicity 3, 2, and 1, respectively). Representing multisets in this fashion is done in some embodiments to help improve the clarity of the description and should not be construed as limiting the disclosure.

In the following discussion, one or more embodiments of the disclosed techniques for UMT resolution are described with the following three exemplary portions:
  set up: how the various parameters are analyzed;
  log ingestion/update: how an initial set of logs is ingested to produce a data structure and how that data structure is updated (in some embodiments, the descriptions of the ingestion and update phases can be merged); and
  UMT resolution: the steps needed for responding to a query about a given user.

Set Up

In one exemplary set up phase, each device μ is assigned a unique prime number p. Recall that a number is a prime if its only divisors are 1 and itself (e.g., 2, 3, 5, 7, 11, 13, 17, are prime numbers, while 9=3*3, 35=5*7, and 51=3*17 are not prime numbers).

For the sake of both efficiency and simplicity, in some embodiments, the prime numbers can be assigned to devices in an order from smallest to largest (though the disclosure need not be practiced this way, as would be apparent to a person of ordinary skill in the art); e.g., device $\mu_1$ can be assigned the prime number 2; device $\mu_2$ can be assigned the prime number 3; device $\mu_3$ can be assigned the prime number 5; and so on. In one variation, specific prime numbers can be assigned to specific devices.

If a new device is encountered, that new device is assigned in some embodiments the next available (unused) prime. Note that there are an infinite number of prime numbers, so this step can be accomplished without any issues. More so, the prime numbers are dense within the integers (especially, for small integers, which will be the case in practice for the exemplary implementations addressed in this disclosure). Thus, finding relatively small prime numbers is straightforward. The assignments can be stored in some embodiments in a table or in any form of key-value store where the device identifier μ is the key and the prime number p assigned to it is the value, as would be apparent to a person of ordinary skill in the art.

In addition, in some embodiments, a data structure is maintained to facilitate the reverse mapping (e.g., mapping the prime number p back to the device identifier μ). Again, this data structure can be a key-value store (e.g., a hash table) where this time the key is the prime number p and the value is the device identifier μ, as would be apparent to a person of ordinary skill in the art.

In some exemplary embodiments of the disclosure, the notation Π(μ) is used to denote the prime number associated with the device μ. Consider Π(•) as a mathematical function, in which case, p←Π(μ) denotes that the prime p is assigned to the device μ. Along similar lines, the notation M(p) denotes the device identifier μ associated with prime p. In this case, μ←M(p).

In one or more embodiments, the per user data structure stores, for a specified user u and timestamp z an integer value (or a pointer to an integer value) associated to that user and timestamp. In one embodiment of the disclosure, a balanced binary tree structure (e.g., a red-black tree) is maintained for each user u. Each node in the tree represents a timestamp and each timestamp node stores (or points) to an integer value. In some cases, the integer being stored or pointed to might be larger than the word size of the underlying microprocessor. In this case, a large integer needs to be stored. There are many methods in the art for storing such larger integers and the present disclosure can be practiced with any of these methods.

Initially, the tree is empty. How this data structure is stored, however, is orthogonal to the present disclosure and there are many known methods, as would be apparent to a person of ordinary skill in the art. One consideration for the present disclosure is that the structure should, when given value for a user u and timestamp r, return the integer value associated with the largest timestamp value in the structure that is less than or equal to r (for the user u).

In addition, a second data structure stores the per user data structures (or stores pointers to those data structures). In one embodiment, this second data structure can be implemented using a key-value store (such as a hash table) where the keys are user identifiers and the values are pointers to the per user data structure (e.g., the root node of the red-black tree associated with the user). However, the implementation of this second data structure is orthogonal and there are many reasonable choices, as would be apparent to a person of ordinary skill in the art, such as variations on binary trees (and binary tree variants like red-black trees), and so on. Both hash tables and binary trees (and binary tree variants) are good choices because of their performance benefits. However, one criterion in some embodiments is that for a user u and timestamp r, it should be efficient to query the per user data structure to retrieve the integer value associated with the largest timestamp value in the structure that is less than or equal to r (for the user u).

Log Ingestion/Update

Figure 3:
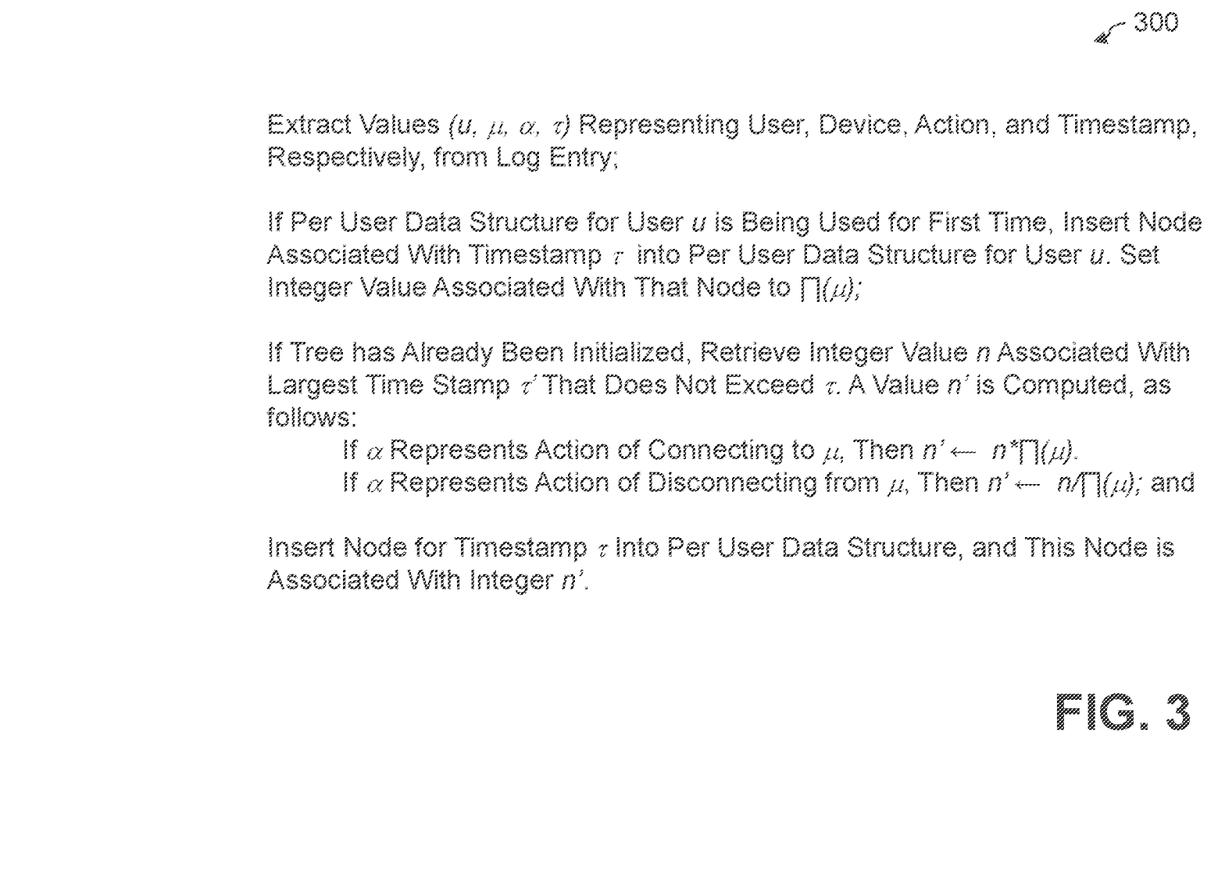
FIG. 3 illustrates exemplary pseudo code for a log ingestion/update process, according to at least one embodiment of the disclosure.

FIG. 3 illustrates exemplary pseudo code for a log ingestion/update process 300, according to at least one embodiment of the disclosure. As shown in FIG. 3, in one or more embodiments, when a new log entry is presented, the new log entry is ingested as follows:

1. The values (u, µ, α, τ) representing the user, device, action, and timestamp, respectively, are extracted from a log entry.

2. If the per user data structure for u is being used for the first time, a node associated with timestamp τ is inserted into the per user data structure for user u. The integer value associated with that node is set to Π(µ).

3. If the tree has already been initialized, the integer value n associated with the largest time stamp τ' that does not exceed τ is retrieved. A value n' is computed as follows:

If a represents the action of connecting to µ, then n'←n*Π(µ).

If a represents the action of disconnecting from µ, then n'←n/Π(µ).

4. A node for timestamp τ is inserted into the per user data structure, and this node is associated with the integer n'. Note that n' will always be an integer.

In particular, during step 4, in the case that a represents that user u is connected to device µ, then n' is the product of two integers, which is still an integer. If α represents that user u disconnected from machine µ, then at some point prior to time τ (e.g., at time τ'), the user u was connected to machine µ, in which case the integer value n associated with (u, τ') would have Π(µ) as a prime factor. If, for any reason n does not include Π(µ) during a disconnection action, then the log entries would themselves not be an accurate representation of the actions taken by users. In that case, an error can be raised or an exception can be thrown. The actions taken in this case are orthogonal to the present disclosure.

In one or more embodiments, the tree is maintained in a sorted order (e.g., for any node, the timestamps of the children in the tree on the left-hand side should be smaller than the timestamp associated with the parent and the timestamp of the children in the tree on the right-hand side should be larger than the timestamp associated with the parent). Moreover, in some embodiments, the tree should be balanced (e.g., no branch should be significantly larger than any other branch; note that red-black trees achieve these properties and, in particular, a red-black tree with n internal nodes has height at most 2lg(n+1).

Both log ingestion and log update follow the same paradigm in some embodiments (since log ingestion can be viewed as a special case of log update (e.g., log ingestion is a series of log updates starting from a clean slate)).

UMT Response

Figure 4:
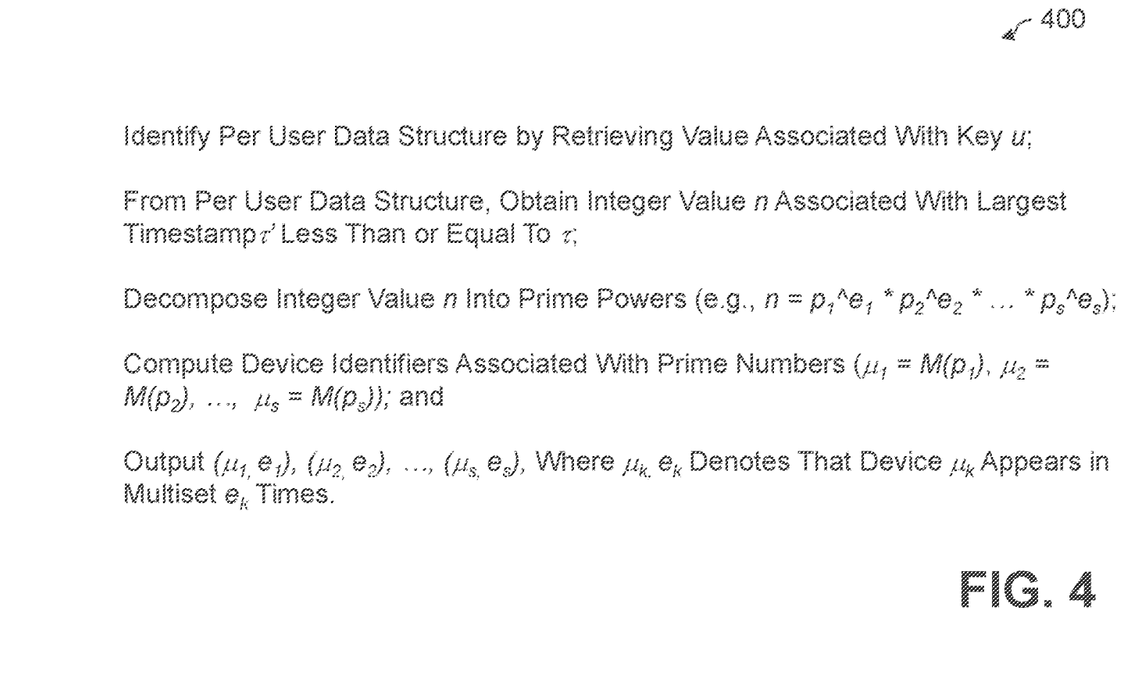
FIG. 4 illustrates exemplary pseudo code for a response process, according to one or more embodiments.

FIG. 4 illustrates exemplary pseudo code for a UMT response process 400, according to one or more embodiments of the disclosure. In the example of FIG. 4, the UMT response process 400 takes as input a user u and a timestamp r. The following steps are then performed to generate a UMT response:

1. Identify the per user data structure by retrieving the value associated with the key u (in at least one embodiment, this value is a pointer to the root node of a red-black tree associated with u).

2. From this per user data structure, obtain the integer value n associated with the largest timestamp τ' less than or equal to τ.

3. Decompose the integer value n into its prime powers; i.e., $n = p_1^{e_1} * p_2^{e_2} * \ldots * p_s^{e_s}$.

4. Compute the device identifiers associated with the prime numbers: $\mu_1 = M(p_1), \mu_2 = M(p_2), \ldots \mu_s = M(p_s)$.

5. Output $(\mu_1, e_1), (\mu_2, e_2), \ldots, (\mu_s, e_s)$ where $\mu_k, e_k$ denotes that device $\mu_k$ appears in the multi set $e_k$ times.

In some embodiments, the disclosed techniques for efficient multiset storage and maintenance associate a multiset of device identifiers with a single integer value by means of multiplying the prime numbers associated with each device identifier. This approach produces a consistent result at least in some embodiments because of the unique factorization theorem, which is well-known to those skilled in the art. The unique factorization theorem states that every integer can be uniquely decomposed into a product of prime powers. In other words, there is one (and only one) way of representing an integer n as $p_1^{e_1} * p_2^{e_2} * \ldots * p_s^{e_s}$ where $p_1 < p_2 < \ldots < p_s$ are prime numbers (in monotonically increasing order) and $e_1, e_2, \ldots, e_s$ are positive integer values. To be more precise, if $n = p_1^{e_1} * p_2^{e_2} * \ldots * p_s^{e_s} = q_1^{d_1} * q_2^{d_2} * \ldots * q_t^{d_t}$, where, $p_1 < p_2 < \ldots < p_s$ are prime numbers (in monotonically increasing order), $q_1 < q_2 < \ldots < q_t$ are prime numbers (in monotonically increasing order), $e_1, e_2, \ldots, e_s$ are positive integers, and $d_1, d_2, \ldots, d_t$ are positive integers Then, in one or more embodiments:

s=t $p_1 = q_1, p_2 = q_2, \ldots, p_s = q_s$, and $e_1 = d_1, e_2 = d_2, \ldots, e_s = d_s$ The unique factorization theorem assures in some embodiments that when the integer representing the multiset of devices is decomposed into its prime factorization, the correct multiset is returned.

In one or more embodiments, the disclosed multiset encoding approach achieves a certain type of tightness guarantee. In particular, because every integer value can be decomposed into a product of prime powers in a unique way, then every integer would have associated with it a corresponding multiset of devices. In other words, there is an invertible mapping (e.g., a bijection) between every positive integer and every multiset of devices that can arise in practice. No value is "wasted." In a sense, in at least some embodiments, the disclosed method gives an optimal compressed representation of multisets. The compression method is lossless in the sense that every multiset can be mapped to a unique integer and every integer can be mapped back to the (unique) original multiset.

For the disclosed approach to work effectively, it should be feasible in some embodiments to identify the prime numbers to which devices are mapped. In this vein, two important considerations are worth noting. First, it is known to those skilled in the art that there are infinitely many prime numbers. Second, prime numbers appear with relative frequency. The well-known prime number theorem states that for large enough values of N, the number of prime numbers less than or equal to N can be roughly approximated by N/log(N). Put differently, roughly 1/n numbers (that are n-bits long) are prime. Note that this result applies for large N. For small values of N, the number of prime numbers is denser. In the case of the exemplary network connectivity application described herein, there are typically small values of N. For example, the hundred-thousandth prime number is 1,299,709 and the millionth prime number is 15,485,863. In each case, one or more embodiments need to effectively store just an extra digit compared to the number itself (and, on average, this requires about 3.22 extra bits).

One or more aspects of the disclosure recognize that many of the operations described herein rely on standard data structures. The one notable exception is the prime factorization step. In a worst case, prime factorization is considered intractable and there are well-known cryptographic algorithms that appeal to the hardness of prime factorization, the most notable being the RSA algorithm for encryption. However, it is known to those skilled in the art that the complexity of factorization focuses on the worst-case scenario. For example, for the RSA algorithm, extremely large prime numbers are chosen (e.g., more than a thousand bits each). For at least some of the methods described herein, these limitations are not a concern. In particular, the disclosed approach involves picking small prime numbers. More so, because each prime number is associated with a device identifier, the number of prime numbers needed is bounded by the number of devices an organization is tracking. Even if an organization is tracking a million devices, the largest prime used will be 15,485,863. When all prime factors being considered are small, integer factorization is a more efficient process. For example, determining whether or not a prime number p is a factor of an integer N can be accomplished using algorithms for computing the Greatest Common Divisor (GCD). Two algorithms known in the art for doing so efficiently are the Euclidean GCD and Binary GCD algorithms. These algorithms can be used to quickly identify prime factors.

Another operation involved that should be considered is (large) integer multiplication and division. There are fairly efficient algorithms known to those skilled in the art for performing these operations. In the case of the disclosed exemplary multiset encoding and evaluation methods, the procedures are generally more efficient since (at least) one of the numbers involved is small (fitting the standard word size). Since modern microprocessors can perform single word-level operations efficiently (typically within a single clock cycle because of pipelining and efficient co-processors), the complexity of basic operations required to implement the insertion and deletion steps moves from quadratic computational complexity to linear complexity.

Figure 5:
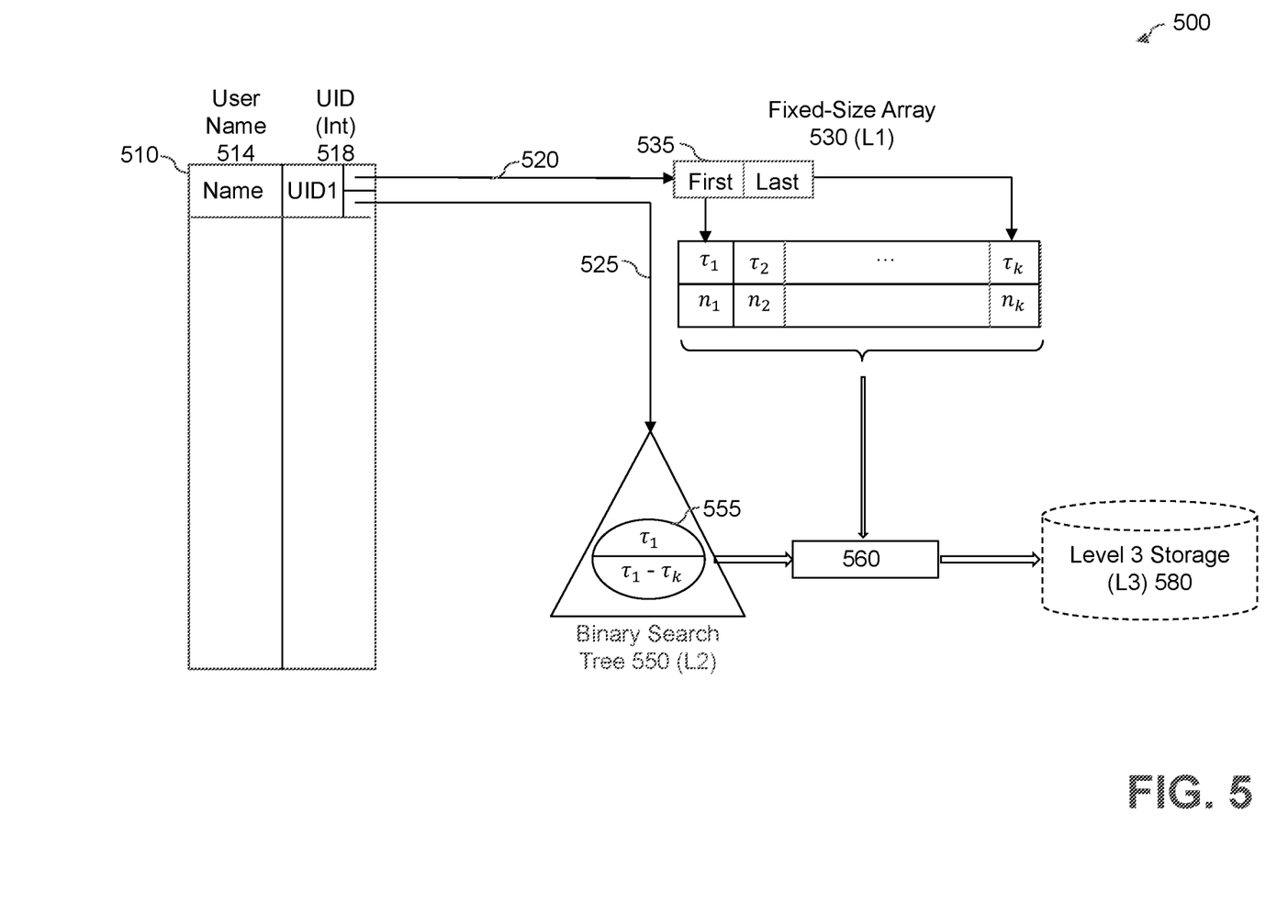
FIG. 5 illustrates an exemplary multiset storage system, according to an embodiment of the disclosure.

FIG. 5 illustrates an exemplary multiset storage system 500, according to an embodiment of the disclosure. In the example of FIG. 5, the exemplary multiset storage system 500 supports an Enrichment Server architecture and comprises a per user database 510 that maintains, for each user, an array 530 of fixed size, k, to store connection events, such as logon and logoff events, and the corresponding multisets $n_1$. The size of the array 530 for L1 storage is configurable (e.g., k=100 will store 100 events). The fixed size array 530 may be maintained, in one or more embodiments, in a Level 1 storage (L1) of a multi-level cache. With an L1 implementation, the exemplary array 530 provides fast access to the entries of the array 530, and permits efficient insertion and searching of the entries of the array 530. The connection events recorded in the array 530 may be obtained, for example, from an LDAP (Lightweight Directory Access Protocol) server (not shown in FIG. 5). In some implementations, each LDAP event occupies an element of the exemplary array 530.

Once the array 530 for a given user is filled (e.g., the array 530 stores k connection events), then, in one or more embodiments, the array 530 is compressed and added as a node 555 to a binary search tree (BST) 550, keyed, for example, by the first timestamp (e.g., $\tau_1$) of each array 530. The BST 550 may be maintained, in one or more embodiments, in a Level 2 storage (L2) of the multi-level cache. L2 storage keeps older data in resident memory in compact form and provides logarithmic access to data with the additional overhead of decompressing the original array, as would be apparent to a person of ordinary skill in the art.

In addition, once the array 530 for the given user is filled, then, in one or more embodiments, the entries of the array 530 are serialized at stage 560 to an exemplary Level 3 storage (L3) 580, such as a hard disk drive. In this manner, if the resident memory is exhausted, the L2 storage comprising the BST 550 can be released, because they have been serialized to disk or other L3 storage 580. For example, for each user, a file can be kept on disk or other L3 storage 580, where each compressed L1 array 530 is appended. Storing compressed snapshots of L1 arrays to disk in this manner reduces the data transfers between resident memory and hard disk at the nominal cost of decompression of desired segments. This organization will effectively increase the transfer rates and throughput of the system and provides persistence at the same time.

In some embodiments, each user is identified in the per user database 510, for example, by name in field 514 and/or a user identifier (e.g., UID) in field 518. In the example of FIG. 5, the UID field 518 comprises a first pointer 520 to the fixed array 530 for the respective user, and a second pointer 525 to the BST 550. The first pointer 520 to the fixed array 530 provides access to a data element 535 identifying the first and last entries in the fixed array 530 for the respective user.

One or more aspects of the disclosure recognize that it is common to have laptop devices and/or desktop devices assigned to each employee of an organization. Thus, in some embodiments, the number of GCDs required to compute the multiset representation can be reduced. Each user is associated with a prime number that corresponds to the device that the user is assigned. These prime numbers are referred to herein as sticky prime numbers, as they will be likely factors of any multiset device representation at any time. For example, if user $u_1$ is assigned device $\mu_1$, then the sticky prime for $u_1$ is $\Pi(\mu_1)$. The sticky prime numbers for each user can also be kept in a hash table, where the user identifier is the key and the sticky prime is the value. When a request for resolving what devices a given user, say $u_1$, is logged on to at a given time, the corresponding integer representation, n, of the multiset is obtained. All factors (if any) associated with the sticky prime, $\Pi(\mu_1)$, of the device, are obtained from the multiset representation of n.

Figure 6:
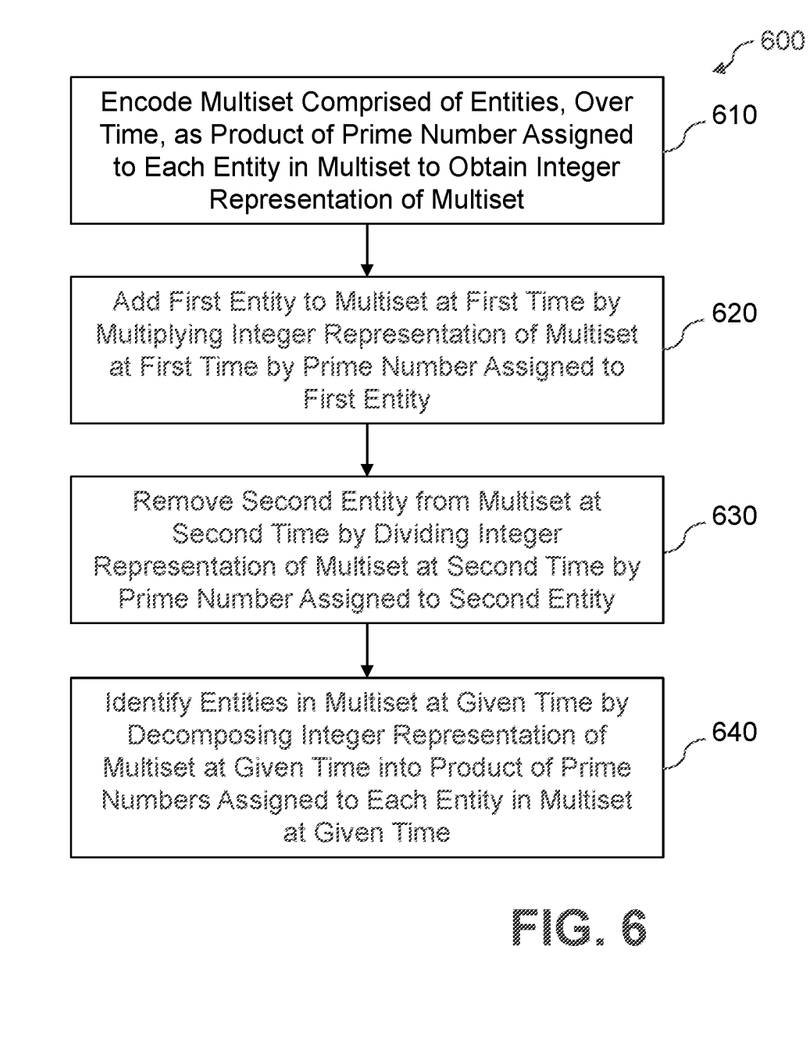
FIG. 6 is a flow chart illustrating an exemplary implementation of a multiset encoding and evaluation process, according to one embodiment of the disclosure.

FIG. 6 is a flow chart illustrating an exemplary implementation of a multiset encoding and evaluation process 600, according to one embodiment of the disclosure. As shown in FIG. 6, the exemplary multiset encoding and evaluation process 600 initially encodes a multiset comprised of entities, over time, during step 610, as a product of a prime number assigned to each of the entities in the multiset to obtain an integer representation of the multiset.

A first entity is added to the multiset during step 620 at a first time by multiplying the integer representation of the multiset at the first time by the prime number assigned to the first entity. The first entity is permitted to appear multiple times in the multiset. During step 630, a second entity is removed from the multiset at a second time by dividing the integer representation of the multiset at the second time by the prime number assigned to the second entity.

Finally, the exemplary multiset encoding and evaluation process 600 identifies the entities in the multiset at a given time during step 640 by decomposing the integer representation of the multiset at the given time into a product of the prime numbers assigned to each of the entities in the multiset at the given time.

In some embodiments, the mapping of prime numbers to devices (for example, in the mapping database 120) can be done in a way that accounts for which devices are commonly used. For example, devices that are more frequently accessed can be assigned smaller prime values. In one embodiment, logs can be sampled to identify device access frequency. Devices can then be sorted by frequency of access. The most commonly accessed device can be assigned the smallest prime number (e.g., 2). The second most commonly accessed device can be assigned the second smallest prime number (e.g., 3), and so on. In this way, the expected size of the representation of a multiset can be minimized.

In one or more embodiments, rather than having a universal mapping of prime numbers to device identifiers, per user mappings from device identifiers to prime numbers can be employed. In this manner, the mapping used for $u_1$ can be different from the mapping used for user $u_2$, and so on. The benefit of this approach is that a given user might access particular devices more frequently. As described above, this approach generalizes the sticky prime optimization. In particular, a user might access his or her home system (e.g., their desktop or laptop) far more than anything else. Smaller prime numbers can be assigned to more frequently accessed devices; e.g., the prime number 2 can be assigned to the user's laptop. At first, the idea of having a separate mapping for each user might seem prohibitively expensive. However, in practice, it might be quite reasonable since the universe of systems that a given user connects to might be relatively modest. Even if there are a hundred thousand systems in a given organization, a single user might only ever connect to one dozen or two dozen devices. The mapping table in the database 120 can be generated dynamically and only include entries for systems to which a user actually connects.

In some embodiments, the mapping database 120 can comprise one table that maps entities to prime numbers, or for each multiset, a smaller table can be employed that maps entities to prime numbers, in order to reduce the norm (size) of the composites that represent the multiset.

In another optional variation, a hybrid approach for the mapping database 120 includes a combination of per user identifiers and global device identifiers. A set of small prime numbers can be reserved for mapping at a per user level. The remaining prime numbers can be used as part of a global mapping. Further, if needed, two integer values can be maintained in the per user data structure (one representing devices associated with the per user map and one representing devices that are part of a universal mapping). The drawback here is that two integers are maintained. However, the prime numbers associated with each integer representation will be smaller and the corresponding insert and delete operations will be more efficient (since they will only operate on one out of the two smaller integers).

In another embodiment, rather than mapping single devices to prime numbers, sets or multisets of devices can be mapped to a single prime number. While the number of possible sets of devices can combinatorially explode, this approach can be applied for specific sets (or multisets). The benefit of this approach is that certain multisets may occur frequently. For example, perhaps 90% of the time, whenever a user connects to device A, then that same user also connects to device B at the same time (or within a similar time period). In that case, a prime number may be mapped to the multiset for improved compression.

In some embodiments, rather than identifying mappings for each possible timestamp value, it is straightforward to extend these techniques to incorporate a range of time values; e.g., instead of answering the question about which systems a user was logged into at time period 12, it may be enough to know which systems a user was logged into between time periods 10 and 15. Storing information about intervals rather than specific devices has the benefit that the storage costs can be reduced significantly, albeit a tradeoff of losing granularity into what happened at a specific time interval, as would be apparent to a person of ordinary skill in the art.

It is noted that the use of prime powers and factorization for multiset compression can potentially be used in other settings and might be of independent interest, based on the present disclosure. The disclosed techniques for multiset encoding and evaluation can also be employed to identify, for a given time value and device, the set of users who are connected to that device, as noted above. The approach follows the method outlined above, except that users are now mapped to prime numbers and a per-device data structure is maintained with time stamps.

In some embodiments, the disclosed techniques for multiset encoding and evaluation exhibit improved usage of storage resources, and improved computational efficiency for inserting and removing entities from a multiset.

One or more embodiments of the disclosure provide improved methods, apparatus and computer program products for multiset encoding and evaluation. The foregoing applications and associated embodiments should be considered as illustrative only, and numerous other embodiments can be configured using the techniques disclosed herein, in a wide variety of different applications.

It should also be understood that the disclosed multiset encoding and evaluation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for multiset encoding and evaluation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multiset encoding and evaluation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based multiset encoding and evaluation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
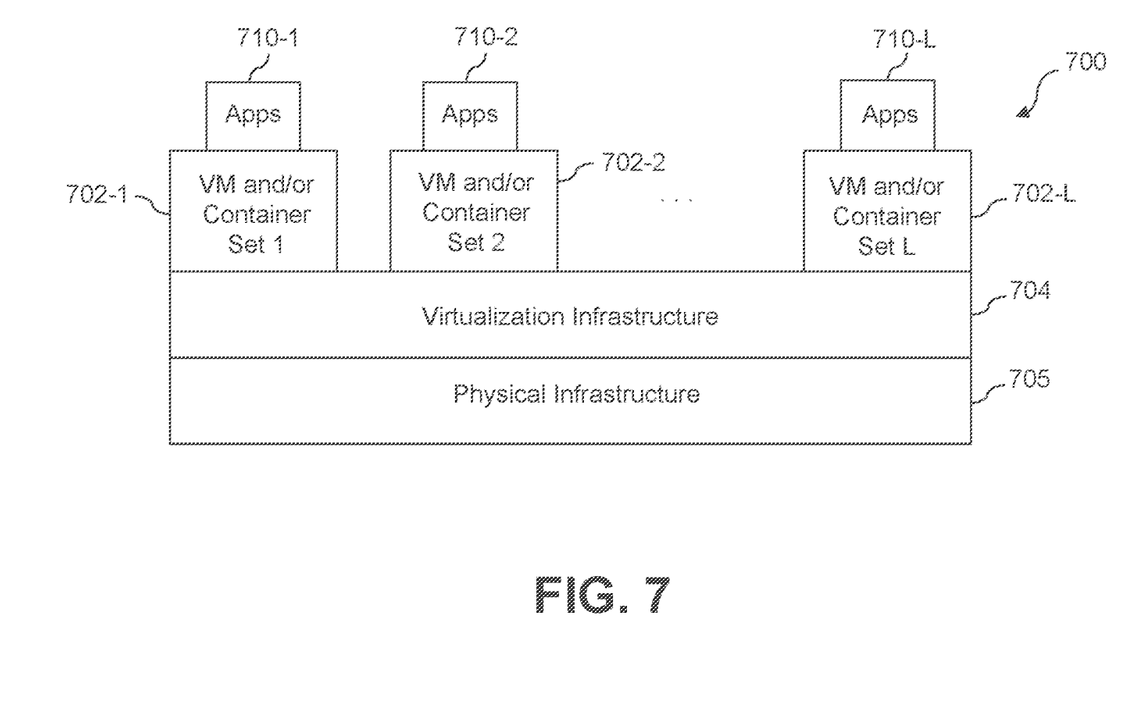
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of an information processing system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide multiset encoding and evaluation functionality of the type described above for one or more processes running on a given one of the VMs. For example, each of the VMs can implement multiset encoding and evaluation control logic and associated decomposition of integer representations of multisets for providing multiset evaluation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide multiset encoding and evaluation functionality of the type described above for one or more processes running on different ones of the containers. For example, a container host device supporting multiple containers of one or more container sets can implement one or more instances of multiset encoding and evaluation control logic and associated decomposition of integer representations of multisets for providing multiset evaluation functionality.

As is apparent from the above, one or more of the processing modules or other components of the exemplary multiset encoding and evaluation system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
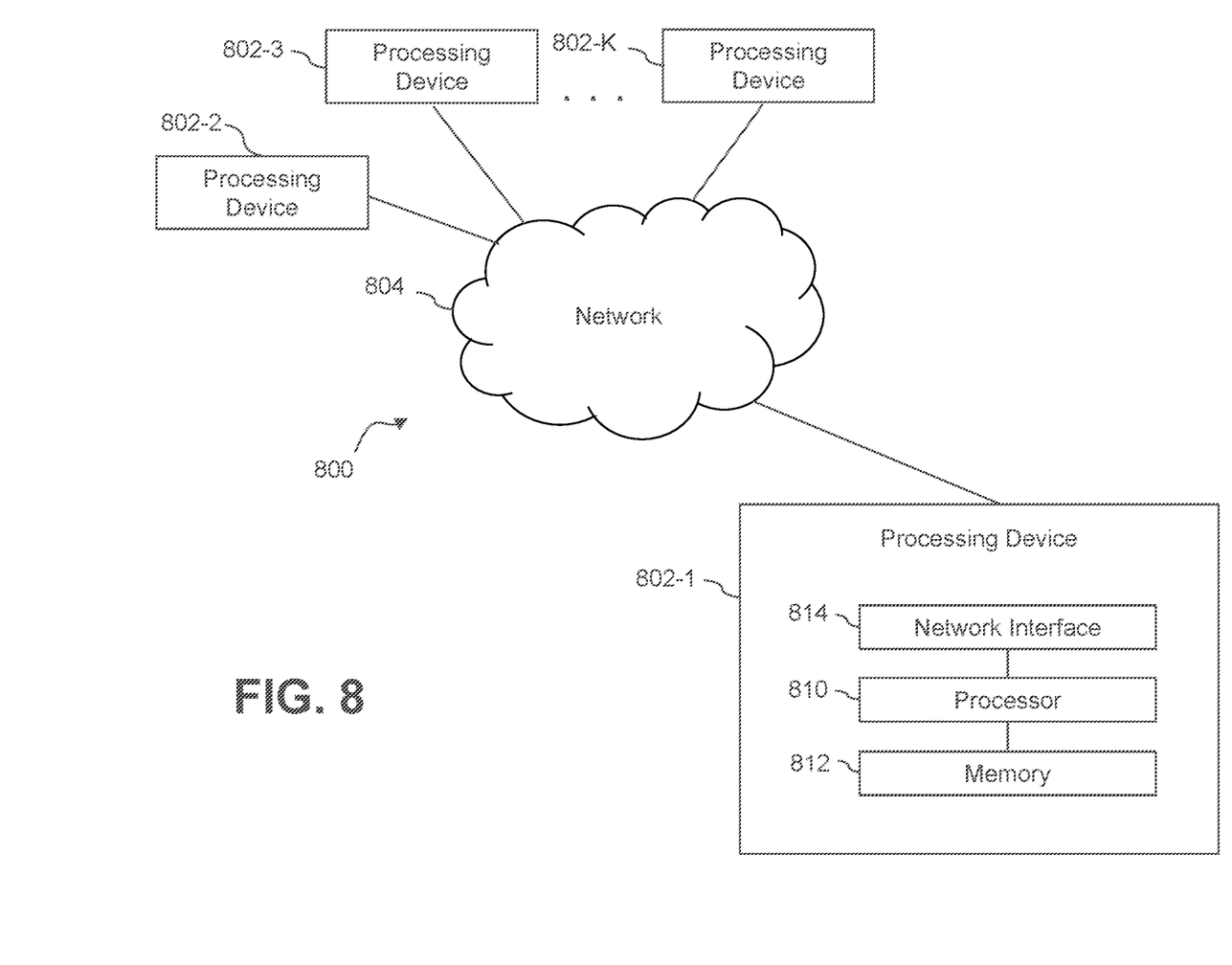
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
encoding a multiset comprised of a plurality of entities, over time, as a product of a prime number assigned to each of the entities in the multiset to obtain an integer representation of the multiset, wherein an entity to be added to the plurality of entities in the multiset is added at a first time by multiplying the integer representation of the multiset at the first time by the prime number assigned to the entity to be added, wherein a given entity is permitted to appear multiple times in the multiset, and wherein an entity to be removed from the plurality of entities in the multiset is removed at a second time by dividing the integer representation of the multiset at the second time by the prime number assigned to the entity to be removed; and
identifying the entities in the multiset at a given time by decomposing the integer representation of the multiset at the given time into a product of the prime numbers assigned to each of the entities in the multiset at the given time,
wherein the method is performed by at least one processing device comprising a processor coupled to a memory.

2. The method of claim 1, wherein the repeated appearance of the given entity in the multiset is represented using the prime number assigned to the given entity with an indication of the number of times that the given entity appears in the multiset.

3. The method of claim 1, wherein the obtaining the multiset comprises ingesting network connectivity log data, and wherein the identifying the entities in the multiset at the given time comprises one or more of: (i) identifying devices that a given user was connected to at the given time; and (ii) identifying a plurality of users connected to a given device at the given time.

4. The method of claim 3, further comprising maintaining a per user mapping of device identifiers to prime numbers.

5. The method of claim 3, further comprising mapping one or more of sets of devices and multisets of devices to a given prime number.

6. The method of claim 1, wherein the identifying the entities in the multiset at the given time identifies the entities in the multiset for a time range.

7. The method of claim 1, further comprising updating the multiset to include additional entities.

8. The method of claim 1, further comprising maintaining one or more of: (i) a mapping between an identifier of each of the entities and the corresponding prime number; and (ii) a mapping between each prime number and an identifier of the corresponding entity.

9. The method of claim 1, wherein every integer representation of the multiset over time has a corresponding multiset of entities.

10. The method of claim 1, wherein a size of the prime number assigned to each entity is based on a frequency of appearance of each entity in the multiset.

11. The method of claim 1, further comprising maintaining, for each multiset, a mapping between an identifier of each of the entities and the corresponding prime number in a manner that reduces a size of the integer representation of the multiset relative to one or more of a random mapping and a global mapping.

12. An apparatus comprising:
at least one processing device comprising a processor coupled to a memory;
the at least one processing device being configured to implement the following steps:
encoding a multiset comprised of a plurality of entities, over time, as a product of a prime number assigned to each of the entities in the multiset to obtain an integer representation of the multiset, wherein an entity to be added to the plurality of entities in the multiset is added at a first time by multiplying the integer representation of the multiset at the first time by the prime number assigned to the entity to be added, wherein a given entity is permitted to appear multiple times in the multiset, and wherein an entity to be removed from the plurality of entities in the multiset is removed at a second time by dividing the integer representation of the multiset at the second time by the prime number assigned to the entity to be removed; and
identifying the entities in the multiset at a given time by decomposing the integer representation of the multiset at the given time into a product of the prime numbers assigned to each of the entities in the multiset at the given time.

13. The apparatus of claim 12, wherein the obtaining the multiset comprises ingesting network connectivity log data, and wherein the identifying the entities in the multiset at the given time comprises one or more of: (i) identifying devices that a given user was connected to at the given time; and (ii) identifying a plurality of users connected to a given device at the given time.

14. The apparatus of claim 12, further comprising maintaining one or more of: (i) a mapping between an identifier of each of the entities and the corresponding prime number; and (ii) a mapping between each prime number and an identifier of the corresponding entity.

15. The apparatus of claim 12, wherein a size of the prime number assigned to each entity is based on a frequency of appearance of each entity in the multiset.

16. The apparatus of claim 12, further comprising maintaining, for each multiset, a mapping between an identifier of each of the entities and the corresponding prime number in a manner that reduces a size of the integer representation of the multiset relative to one or more of a random mapping and a global mapping.

17. A non-transitory processor-readable storage medium having stored therein program code of one or more software programs, wherein the program code when executed by at least one processing device causes the at least one processing device to perform the following steps:
encoding a multiset comprised of a plurality of entities, over time, as a product of a prime number assigned to each of the entities in the multiset to obtain an integer representation of the multiset, wherein an entity to be added to the plurality of entities in the multiset is added at a first time by multiplying the integer representation of the multiset at the first time by the prime number assigned to the entity to be added, wherein a given entity is permitted to appear multiple times in the multiset, and wherein an entity to be removed from the plurality of entities in the multiset is removed at a second time by dividing the integer representation of the multiset at the second time by the prime number assigned to the entity to be removed; and
identifying the entities in the multiset at a given time by decomposing the integer representation of the multiset at the given time into a product of the prime numbers assigned to each of the entities in the multiset at the given time.

18. The non-transitory processor-readable storage medium of claim 17, wherein the obtaining the multiset comprises ingesting network connectivity log data, and wherein the identifying the entities in the multiset at the given time comprises one or more of: (i) identifying devices that a given user was connected to at the given time; and (ii) identifying a plurality of users connected to a given device at the given time.

19. The non-transitory processor-readable storage medium of claim 17, further comprising maintaining one or more of: (i) a mapping between an identifier of each of the entities and the corresponding prime number; and (ii) a mapping between each prime number and an identifier of the corresponding entity.

20. The non-transitory processor-readable storage medium of claim 17, further comprising maintaining, for each multiset, a mapping between an identifier of each of the entities and the corresponding prime number in a manner that reduces a size of the integer representation of the multiset relative to one or more of a random mapping and a global mapping.

* * * * *

UNITED STATES PATENT AND TRADEMARK OFFICE
CERTIFICATE OF CORRECTION

PATENT NO. : 11,269,595 B2
APPLICATION NO. : 16/671292
DATED : March 8, 2022
INVENTOR(S) : Zulfikar A. Ramzan et al.

It is certified that error appears in the above-identified patent and that said Letters Patent is hereby corrected as shown below:

On the Title Page

In the Abstract, Line 2, replace "One method comprises encoding a multi set comprised," with -- One method comprises encoding a multiset comprised --

Signed and Sealed this
Twenty-first Day of June, 2022

Katherine Kelly Vidal
*Director of the United States Patent and Trademark Office*